United States Patent
Warhurst

[19]

[11] Patent Number: 6,155,770
[45] Date of Patent: Dec. 5, 2000

[54] APPARATUS FOR LIFTING, HANDLING AND TRANSPORTING A CONTAINER

[75] Inventor: Peter S. Warhurst, Belleair, Fla.

[73] Assignee: PODS, Inc., St. Petersburg, Fla.

[21] Appl. No.: 09/514,104

[22] Filed: Feb. 28, 2000

Related U.S. Application Data

[63] Continuation-in-part of application No. 09/108,980, Jul. 1, 1998, Pat. No. 6,071,062.

[51] Int. Cl.$^7$ ........................................... B60P 1/64
[52] U.S. Cl. ........................... 414/498; 414/347; 414/458
[58] Field of Search ..................... 414/340, 341, 414/347, 458, 459, 460, 461, 498, 500, 501, 522, 495

[56] References Cited

U.S. PATENT DOCUMENTS

| | | | |
|---|---|---|---|
| 2,197,375 | 4/1940 | Dafnis | 104/48 |
| 2,703,659 | 3/1955 | Hutchins | 414/498 |
| 2,937,879 | 5/1960 | Lion | 280/13.21 |
| 3,135,407 | 6/1964 | Back | 414/498 |
| 3,243,193 | 3/1966 | Fulmer et al. | 280/35 |
| 3,541,598 | 11/1970 | Dousset | 214/392 |
| 3,744,652 | 7/1973 | Rieschel | 414/459 |
| 3,881,689 | 5/1975 | Bury et al. | 254/45 |
| 4,297,068 | 10/1981 | Concha et al. | 414/458 |
| 4,491,452 | 1/1985 | Matovich | 414/458 |
| 4,522,550 | 6/1985 | Whitehouse | 414/498 |
| 4,712,966 | 12/1987 | Gross | 414/458 |
| 4,765,594 | 8/1988 | Riedl et al. | 254/45 |
| 4,897,011 | 1/1990 | Brower | 414/459 |
| 5,006,031 | 4/1991 | Fossing et al. | 414/458 |
| 5,417,540 | 5/1995 | Cox | 414/498 |
| 5,800,114 | 9/1998 | Secondi | 414/498 |

*Primary Examiner*—Dean J. Kramer
*Attorney, Agent, or Firm*—Dennis G. LaPointe; Mason & Assoc., P.A.

[57] ABSTRACT

A hydraulically actuated mobile carrier frame wraps around a storage container of standard size and lifts the container from the ground onto a transport vehicle. The carrier frame subsequently returns the container to the ground. The carrier frame stays with the vehicle or remains in a storage facility for handling containers within the facility. The carrier frame can be expanded transversely to clear the vehicle for loading and unloading.

8 Claims, 9 Drawing Sheets

APPARATUS FOR LIFTING, HANDLING AND TRANSPORTING A CONTAINER

RELATED APPLICATION

This application is a continuation in part of U.S. patent application Ser. No. 09/108,980 filed Jul. 1, 1998 now U.S. Pat. No. 6,071,062.

FIELD OF THE INVENTION

The present invention relates generally to the field of storage containers, and pertains, more specifically, to a method and apparatus for lifting and handling a storage container, loading it onto a road vehicle, transporting it to a given location, and unloading the container from the vehicle.

BACKGROUND OF THE INVENTION

Industry often has requirement s to lift and transport containers. Many freight yards and ocean shipping docks use cranes of various types with lifting cables that attach to the corner brackets that are found on most shipping containers. Methods and apparatus for lifting and transporting containers are known and, heretofore, have been configured in different ways. Some examples of container handling systems in the prior art are seen in the following U.S. patents:

Dousset, U.S. Pat. No. 3,541,598, shows two end-fitted structures, called portals, which are wheeled and have hydraulic jacks. They are attached at upper and lower corners of the container. There are no longitudinal frame elements, only transverse ones. The container thus serves as a structural frame, and must be strong enough to support typically up to 15,000 pounds of cargo. There is no method or apparatus for moving and positioning the portals from the vehicle to the container, and back. This is apparently done by hand, a difficult and dangerous task. There is no structure to quickly and safely lock the portals onto the vehicle for transport, with or without the container.

Fossing, U.S. Pat. No. 5,006,031, also uses two structures, but they are connected together after lifting. The two-wheeled sections, with hydraulic jacks, are attached to the longitudinal sides of the container, not the ends. Cross pieces are connected beneath the container. The attachment brackets have an H-shape.

Bury, U.S. Pat. No. 3,881,689, discloses a four-sided frame for lifting camper bodies. It is U-shaped to fit around the body and has a cross bar fitted across the open end. The jacks are mechanical, and raise the container with respect to the frame. There is no method or apparatus for moving and positioning the frame from the vehicle to the body, and back. The camper body cannot be lowered to the ground. The frame must be dismantled by hand and stored or carried on the vehicle.

Dafnis, U.S. Pat. No. 2,197,375, illustrates a wheeled lifter and transporter for railroad cars. The frame is disposed over the top of the container, not around it. Hydraulic jacks fit below projecting brackets on the car, raising the car with respect to the frame. There is no transport vehicle.

Lion, U.S. Pat. No. 2,937,879, shows a container with built-in hydraulic jacks with wheels, at each corner. The container structure serves as a frame. There is no transport vehicle.

Fulmer, U.S. Pat. No. 3,243,193, discloses an attachable running gear to be fitted to the ends of a container. It consists of a pair of brackets and wheels. The brackets are attached to the ends of the container, then connected together underneath. Hydraulic jacks raise the container.

Concha, U.S. Pat. No. 4,297,068, also discloses an attachable running gear to be fitted to the ends of a container. It consists of a pair of brackets and wheels, with hydraulic jacks.

Gross, U.S. Pat. No. 4,712,966, illustrates a liftable and transportable rack for stackable cargo. There is no closed container or box-like structure. A pair of wheeled brackets with hydraulic jacks fit into the rack ends.

Riedl, U.S. Pat. No. 4,765,594, displays four separate wheel and jack assemblies that are attached to the corners of the container. The jacks are rack and pinion type. The assemblies are not interconnected.

Fulmer, Concha, Riedl, and Fossing show no transport vehicle. The wheels mounted to the container form a trailer.

While the above-described inventions serve to lift and move a container, they are awkward to position around the container. They show difficulty in moving the frame and container into position. The prior art devices disclose no way of changing the width of the frame to provide clearance around the vehicle. They have no way of releasably attaching the frame to the vehicle for safe transport.

Accordingly, there is a need to provide a means for easy positioning of the frame around the container, and for moving and positioning the frame and the container together.

There is a further need to provide a method to adjust the width of the frame under power to clear the vehicle and the container when moving and positioning the frame.

There is a yet further need to provide a means for releasably attaching the frame to the vehicle for safe transport.

SUMMARY OF THE INVENTION

The present invention is a hydraulically actuated mobile carrier frame which wraps around a storage container of standard size and lifts the container from the ground onto a transport vehicle, and subsequently back to the ground. Containers are typically 8 feet wide by 8 feet high by 16 feet long, and weigh up to 15,000 lbs. The carrier frame is not a permanent part of the vehicle, but is normally stored on the vehicle. The actuators of the present invention are actuated by gasoline or diesel engine driven hydraulic pumps mounted on the carrier frame. The carrier frame has swivel wheel assemblies incorporating hydraulic motors and a chain and sprocket drive arrangement installed to the lower end of the front upright members for providing a self-propelled and steerable carrier frame. In another embodiment, the wheels incorporated into the lower end of the front upright members are non-swivel. In this embodiment, the swivel wheel assemblies are instead incorporated at the lower end of the rear upright members. These swivel wheel assemblies would not have the chain and sprocket drives. The non-swivel wheel assemblies would, however, maintain the chain and sprocket drives. The wheels at the lower end of the front and rear upright members are optionally single wheels or dual wheels mounted to a single axle. It is anticipated that the dual wheel use will enable the apparatus to handle higher loads.

The above features, as well as further features and advantages, are attained by the present invention which may be described briefly as an apparatus for lifting and transporting a container having right and left sides and front and rear ends, the apparatus comprising: a carrier frame having right and left longitudinal elements juxtaposed with the right and left sides, respectively, of the container, each longitudinal element extending between opposite first and second ends, the carrier frame having selectively adjustable in length front and rear transverse elements juxtaposed with the front and rear ends, respectively, of the container, each transverse element extending between opposite right and left ends, the left ends of the front and rear transverse elements being adjacent to the first and second ends, respectively, of the left longitudinal element, and the right ends of the front and rear elements being adjacent to the first and second ends, respectively, of the right longitudinal element, the carrier frame further including a plurality of generally vertical upright members attached to the carrier frame, each upright member extending between opposite upper and lower ends; bearing means, attached to each upright member lower end, for ground bearing and relative movement of the upright members with the ground, the bearing means being one of a single wheel assembly or a dual wheel single axle assembly; elevating means for elevating and lowering the carrier frame with respect to the ground; a fixed laterally directed wheel assembly extending downwardly a predetermined distance from each of the right and left longitudinal elements near the front transverse element, the fixed laterally directed wheel assemblies for allowing selective lateral expansion of the carrier frame to clear a transport vehicle platform, the container or both for positioning, and for allowing contraction of the carrier frame into close juxtaposition with a transport vehicle platform, the container or both for transporting; means for providing hydraulic power to actuators; steering and mobility means, connected to the carrier frame, for self-propelled mobility and directional movement of the carrier frame; and supporting means, connected to the carrier frame and to the container, for supporting the container by the carrier frame.

The apparatus can be used for lifting, lowering, or otherwise handling containers on to and off of the platform of the transport vehicle, as well as in and around the storage floor area of a storage facility.

BRIEF DESCRIPTION OF THE DRAWING

The invention will be more fully understood, while still further features and advantages will become apparent, in the following detailed description of preferred embodiments thereof illustrated in the accompanying drawing, in which.

DETAILED DESCRIPTION OF THE DRAWINGS

Referring now to the drawing, and especially to FIGS. 1, 2, 4, 5 and 7, an apparatus for lifting and transporting a container 34 having right and left sides, 30 and 32 respectively, and front and rear ends, 31 and 33 respectively, is shown at 20. The apparatus includes a carrier frame 24 having fixed right 26 and left 28 longitudinal elements juxtaposed with the right 30 and left 32 sides, respectively of the container 34. The right longitudinal element 26 extends between opposite first 36, and second 38 ends. The left longitudinal element 28 extends between opposite first 40, and second 42 ends. The carrier frame 24 has front 44 and rear 46 transverse elements juxtaposed with the front 31 and rear 33 ends, respectively, of the container 34. The front transverse element 44 extends between opposite right 48 and left 50 ends. The rear transverse element 46 extends between opposite right 52 and left 54 ends. The left end 50 of the front transverse element 44 is adjacent to the first 40 end of the left longitudinal element 28. The left end 54 of the rear transverse element 46 and the right end 52 of the rear transverse element 46 are fixed to respective upright members 56 at sufficient height to allow the apparatus to be moved over container 34 while extended, then lowered down for attachment of carrier frame 24 to the container 34. The right end 48 of the front transverse element 44 is adjacent to the first end 36 of the right longitudinal element 26.

The carrier frame 24 includes four generally vertical upright members 56 attached to the carrier frame 24, each upright member 56 extending between opposite upper 58 and lower 60 ends. Wheels 62 are attached to each upright member lower end 60, for ground 110 bearing and relative movement of the upright members 56 with the ground 110. The upright members 56 each comprise a tubular fixed element 64 attached to the carrier frame 24 and a tubular sliding element 66 mounted for sliding movement within the fixed element 64.

Elevating means, specifically a plurality of actuators 68, is mounted within the upright members 56, for elevating and lowering the carrier frame 24 with respect to the ground 110. Each actuator 68 has opposite first 70 and second 72 ends. The first end 70 is attached to the upright member fixed element 64. The second end 72 is attached to the upright member sliding element 66. Thus, upon being actuated in an extending direction as shown by arrow 74 in FIG. 11, the actuators 68 will slideably extend the sliding element 66 from within the fixed element 64 in a telescoping manner, so as to elevate the carrier frame 24. Conversely, upon being actuated in a retracting direction as shown by arrow 76 in FIG. 11, the actuators 68 will slideably retract the sliding element 66 into the fixed element 64 in a telescoping manner, so as to lower the carrier frame 24.

Figure 15:
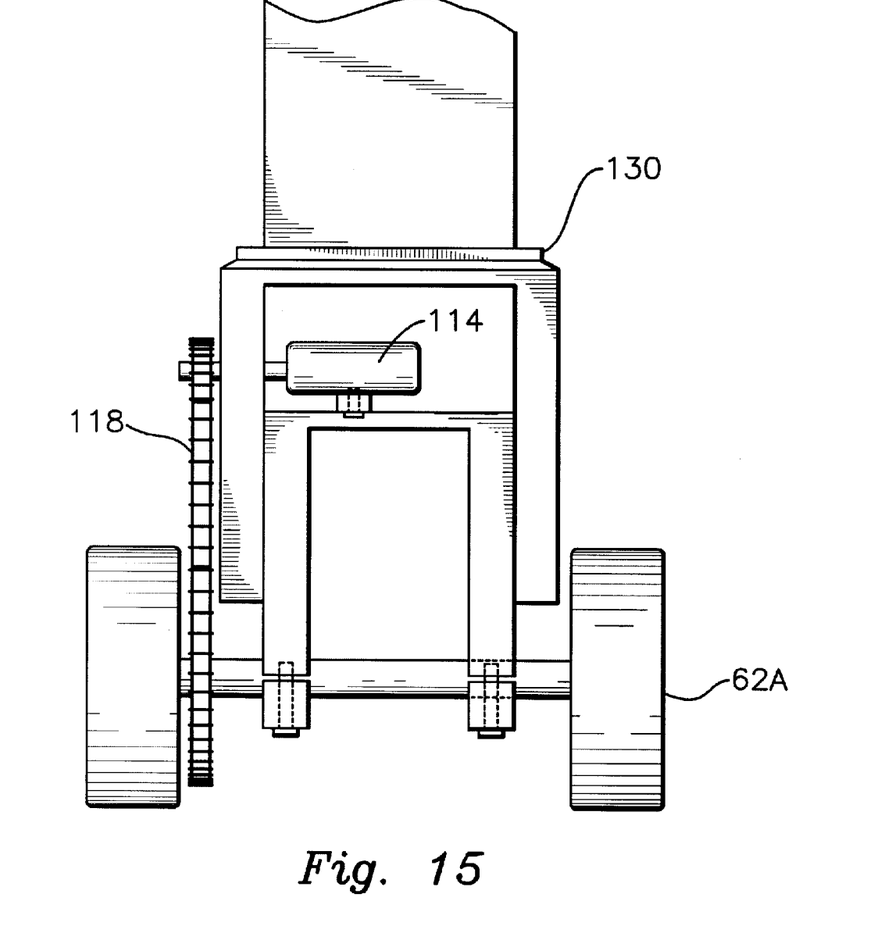
FIG. 15 is a perspective view of one embodiment of the steering and mobility means depicting a non-swivel connection with sprocket chain drive and dual wheel single axle assembly for the lower ends of the rear upright members.
Figure 17:
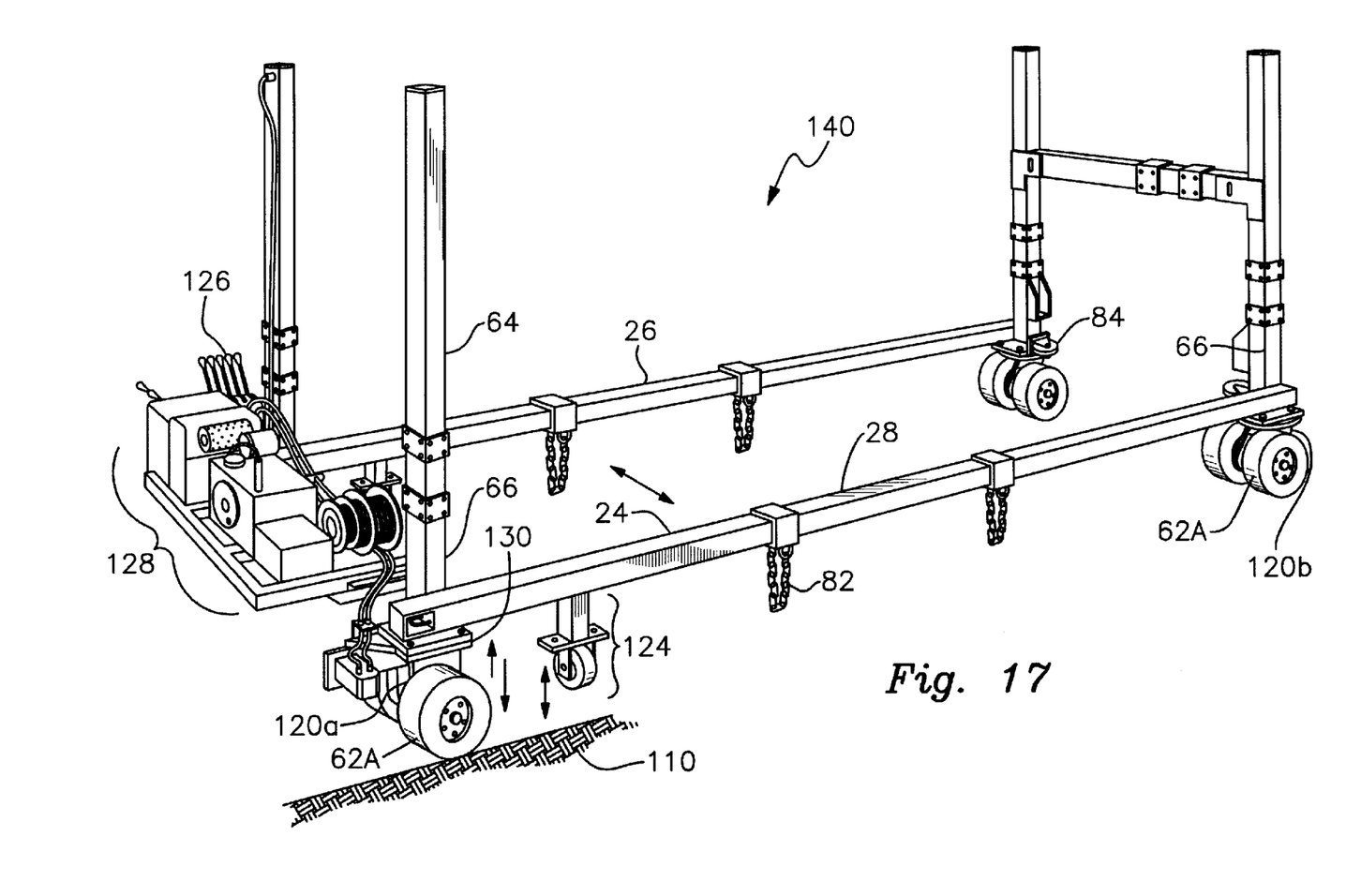
FIG. 17 is a perspective view of an alternative embodiment of the carrier frame of FIG. 8 without the container.

In an attempt to improve the versatility of the invention since the filing of the parent application, it has been determined that changing the bearing means under the lower ends 60 of the front and rear upright members 56 from a single wheel assembly 62 to a dual wheel single axle assembly 62A as shown in FIGS. 15 and 17, will provide increased weight handling capabilities for the apparatus.

Figure 13:
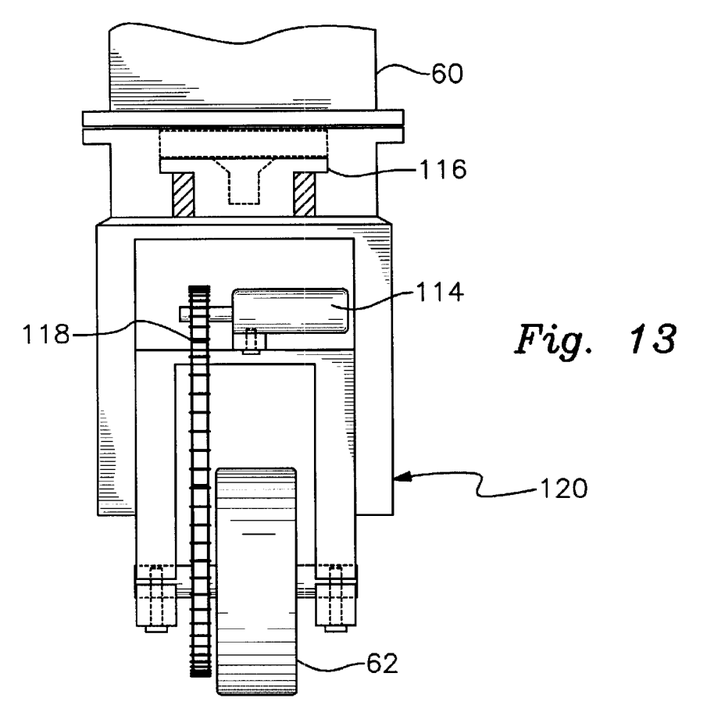
FIG. 13 is a perspective view of the one embodiment of the steering and mobility means depicting front swivel wheel assembly including the hydraulic motor and sprocket chain drive.
Figure 16:
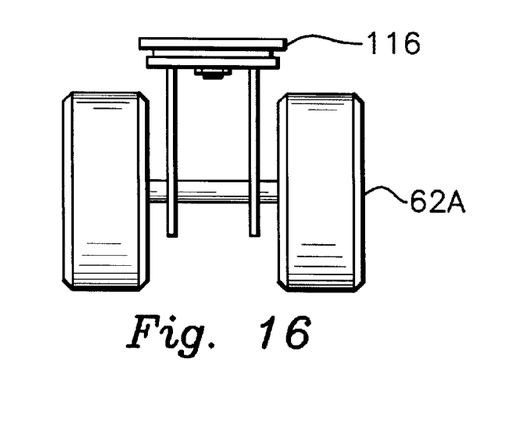
FIG. 16 is a depiction of a dual wheel single axle assembly incorporating a swivel connection for the lower ends of the front upright members.

In a practical application of this embodiment as well as the embodiment using a single wheel 62, it was found that in lieu of incorporating the swivel connection 116 as depicted in FIG. 13, it was desirable to instead make the wheel 62,62A such that the connection is non-swivel 130 under the lower end 60 of the front upright members 56 as depicted in FIGS. 4, 6, 15 and 17. However, the wheels 62,62A at the lower ends 60 of the rear upright members 56 would have a swivel connection at 116 as depicted in FIG. 16. These combined swivel wheel assembly, 120b in FIG. 17, would not include a chain and sprocket drive; however, the combined non-swivel wheel assembly, 120a in FIG. 17, would maintain the sprocket and chain drive 118 feature. As shown in FIG. 17, a typical application of the invention would also include a hydraulic pump and motor assembly 128, generally gasoline or diesel operated, mounted at the front of the carrier frame 24. Hydraulic controls 126 are readily accessible for an operator to manipulate the carrier frame 24 to handle and transport containers 34.

In order to provide additional versatility to maneuver the apparatus in a lateral direction for expansion and contraction of the carrier frame 24 when the apparatus is made with non-swivel connections under the front upright members 56 and swivel connections under the rear upright members 56, a fixed laterally directed wheel assembly 124 extends downwardly a predetermined distance from each of the right and left longitudinal elements 26,28 near the front transverse element 44. The fixed laterally directed wheel assemblies 124 as shown in FIGS. 4, 6, 8, 9, 10 and 17 allow selective lateral expansion of the carrier frame 24 to clear a transport vehicle platform 80, the container 34 or both for positioning, and allow contraction of the carrier frame 24 into close juxtaposition with a transport vehicle platform 80, the container 34 or both for transporting.

Typically, longitudinal elements 26,28 would be lowered until the fixed laterally directed wheel assemblies 124 contact the ground 110. Where the wheel assemblies 124 are located near the front transverse element 44, the front upright members 56 will elevate such the wheels 62,62A will no longer have contact with the ground 110. The carrier frame 24 can then be expanded or contracted as necessary to accommodate clearing a container 34 or platform 80. When the desired position is reached, the front actuators 68 will slideably extend the sliding element 66 from within fixed element 64 in a telescoping manner so as to resume contact to the ground 110 with wheels 62,62A. The fixed laterally directed wheel assemblies 124 are then further elevated to facilitate steering and movement of the carrier frame 24 to handle containers 34.

A transport vehicle 78, such as a specially modified truck, is provided and has a platform 80 suitable for transporting the container 34 and carrier frame 24 simultaneously.

Figure 1:
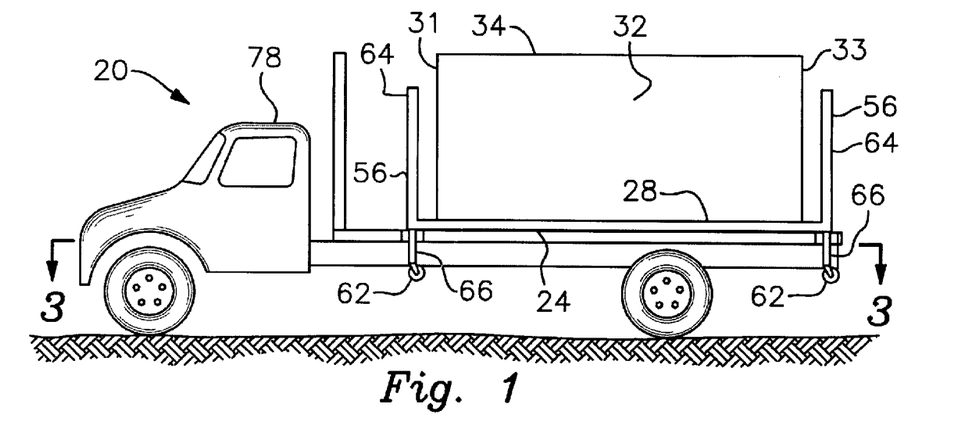
FIG. 1 is a side elevational view of a transport vehicle transporting a storage container and a carrier frame constructed in accordance with one embodiment of the invention.
Figure 2:
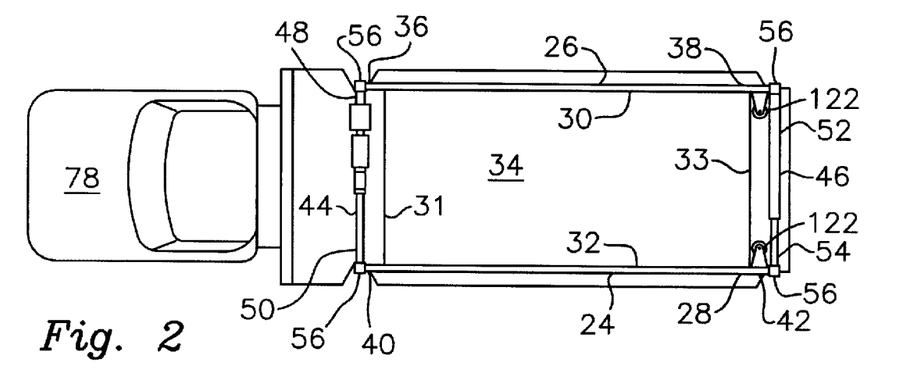
FIG. 2 is a plan view of the transport vehicle, storage container, and carrier frame of FIG. 1.
Figure 3:
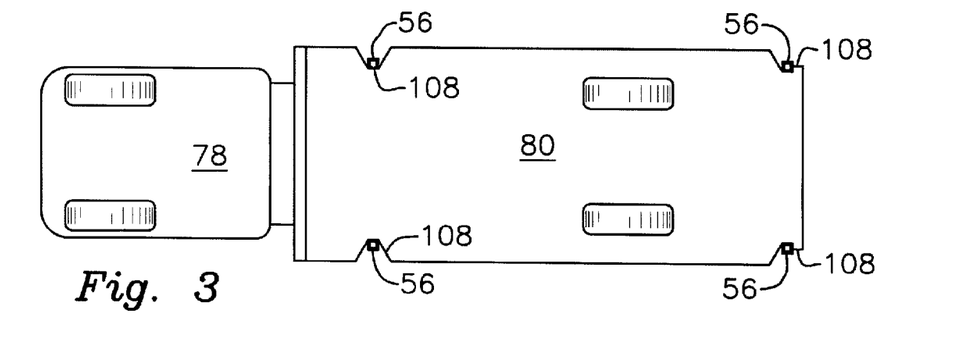
FIG. 3 is a sectional view of the transport vehicle, storage container, and carrier frame of FIG. 1, the section being taken along lines 3—3 of FIG. 1.
Figure 4:
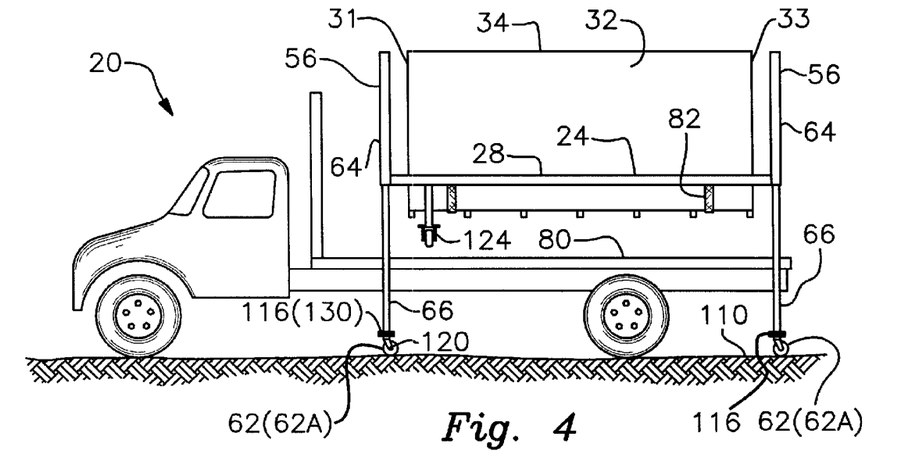
FIG. 4 is a side elevational view of the transport vehicle, storage container and another embodiment of the carrier frame, showing the upright elements extended to the ground and the carrier frame and container elevated above the transport vehicle platform.
Figure 5:
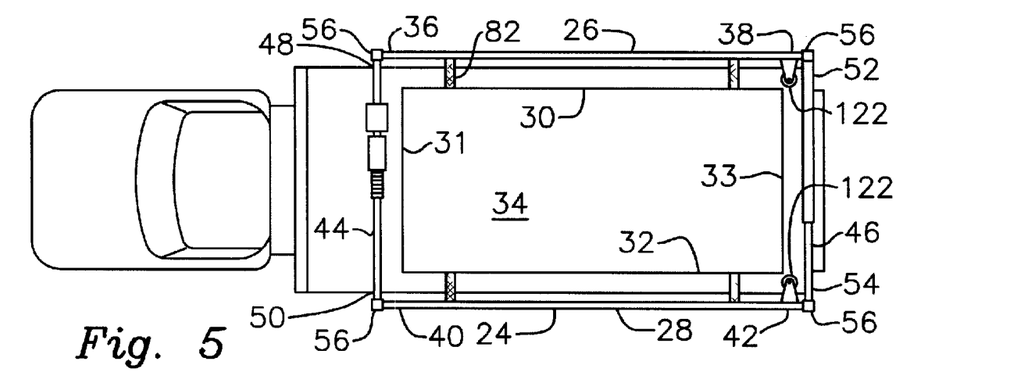
FIG. 5 is a plan view of FIG. 4, showing the transport vehicle, storage container and carrier frame.
Figure 6:
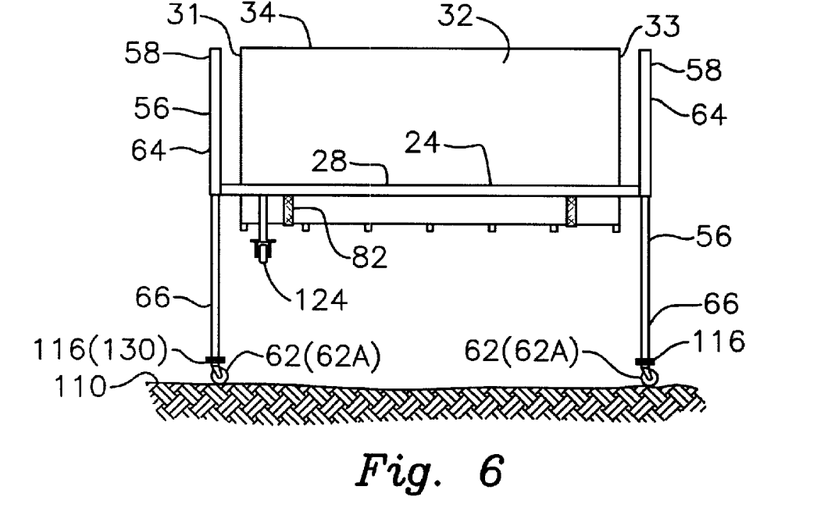
FIG. 6 is a side elevational view of the storage container and carrier frame of FIG. 4, showing the carrier frame and container elevated above the level of the transport vehicle platform.
Figure 7:
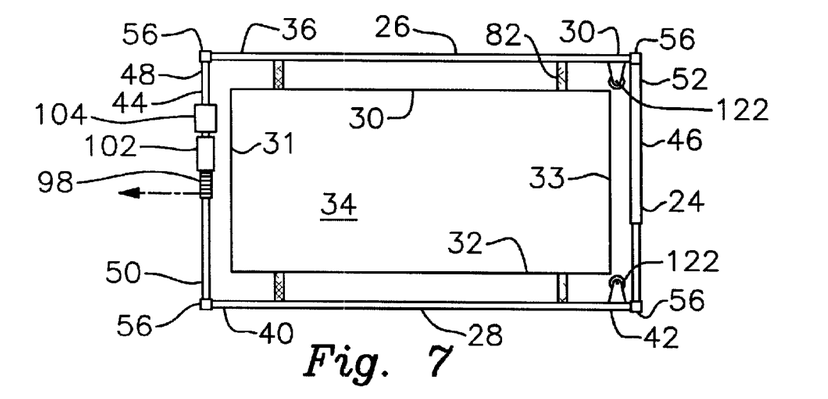
FIG. 7 is a plan view of FIG. 6.
Figure 8:
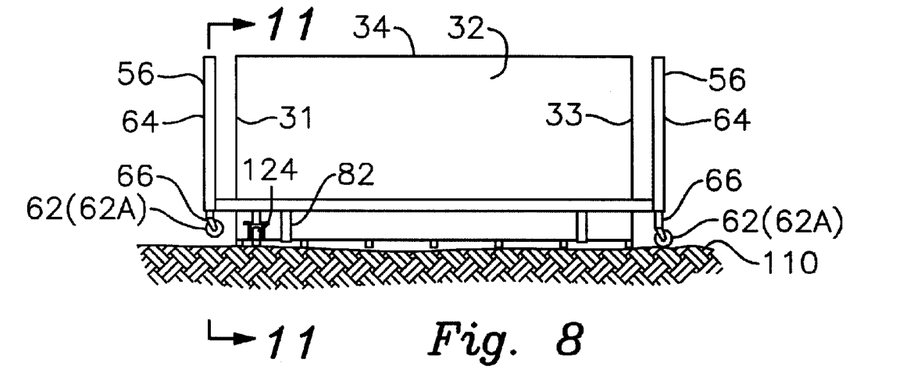
FIG. 8 is a side elevational view of the storage container and carrier frame of FIG. 4, showing the carrier frame and container lowered with the container resting upon the ground.
Figure 9:
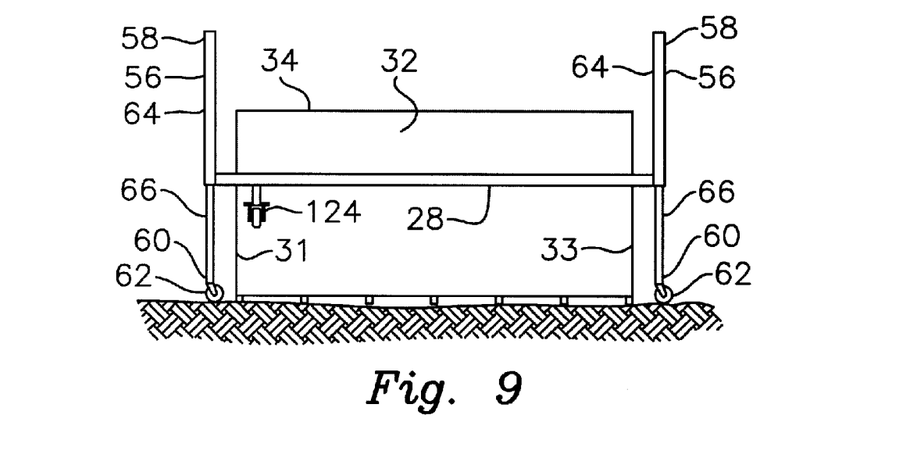
FIG. 9 is a side elevational view of the storage container and carrier frame of FIG. 4, showing the carrier frame elevated above the level of the transport vehicle platform with the container resting upon the ground.
Figure 10:
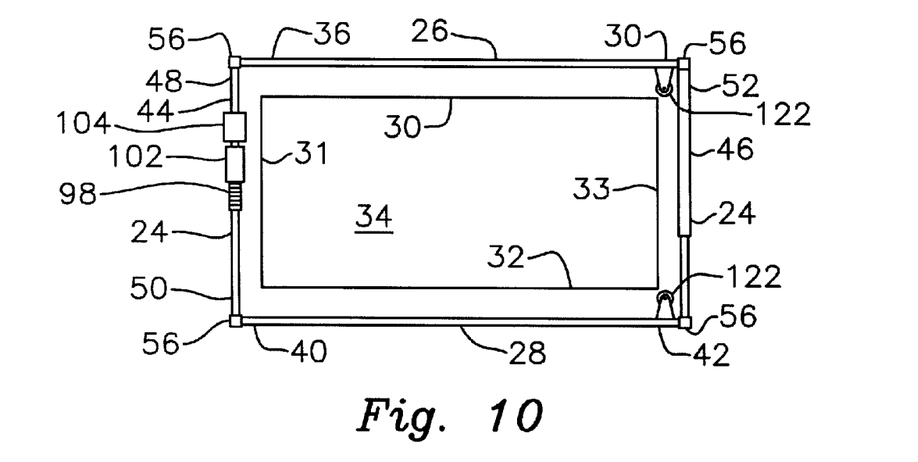
FIG. 10 is a plan view of FIG. 9.
Figure 11:
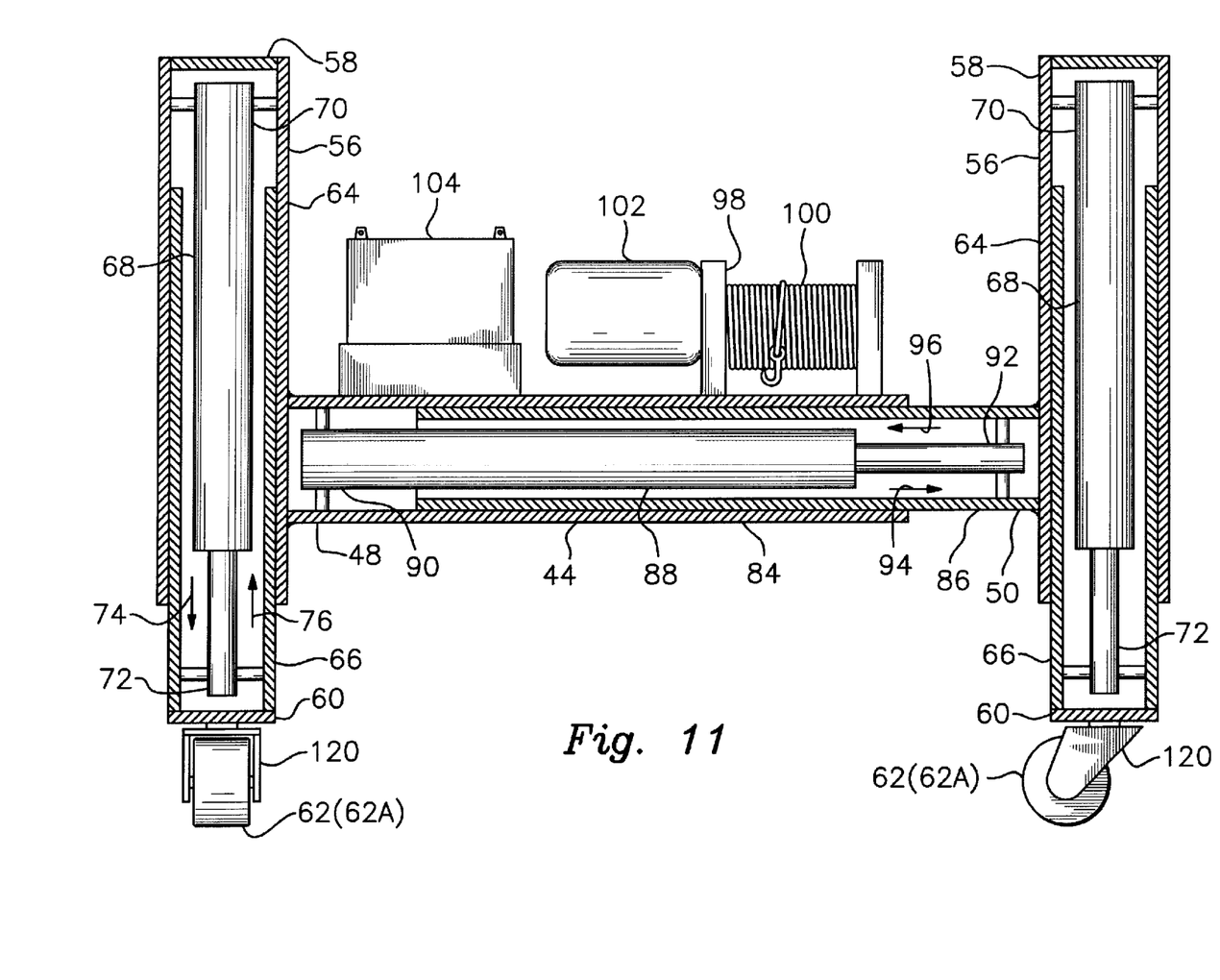
FIG. 11 is a front sectional elevational view of the carrier frame, showing the carrier frame lowered, the section taken along lines 11—11 of FIG. 8.

Although the use of steering and mobility means 120 as depicted in FIG. 13 or 120a,120b in FIG. 17 are preferred embodiments, a winch 98 and cable 100 may alternatively or in conjunction with the mobility and steering means 120, 120a,120b be connected to the carrier frame 24, for moving and positioning the carrier frame 24 with respect to the container 34, and for moving and positioning the carrier frame 24 and container 34 together with respect to the vehicle 78. In this embodiment, the winch 98 is typically mounted on the front transverse element 44, as shown in FIG. 11. The winch 98 is typically operated by an electric motor 102, which is powered by a storage battery 104. The electrical connections for these parts are not shown in the drawing, but are known to anyone skilled in the art.

Supporting means 82 are connected to the carrier frame 24 and to the container 34 for supporting the container 34 by the carrier frame 24. Typically, the supporting means will be four to six chains 82 each affixed on one end to the carrier frame 24 as depicted in FIG. 17. A hook is located on the other end of each chain 82 for engaging an eye (not shown) on the container 34.

The carrier frame 24 includes a pair of guide wheels 122, each wheel being mounted for rotation on a generally vertical axis on an upright member 56 adjacent the rear transverse element 46, with the guide wheels 122 facing inward toward the container 34. As the carrier frame 24 is being moved into position around the container 34, the guide wheels 122 roll against the container 34 to reduce friction therewith, and thus facilitate positioning the carrier frame 24 with the container 34.

The front 44 and rear 46 transverse elements are selectively adjustable in length, so as to allow expansion of the carrier frame 24 to clear the vehicle 78 and the container 34 for positioning, and contraction of the carrier frame 24 into close juxtaposition with the vehicle 78 and the container 34 for transport.

The front transverse element 44 further comprises a tubular fixed element 84, and a tubular sliding element 86 mounted for sliding movement within the fixed element 84. An actuator 88 is mounted within the front transverse element 44. The actuator 88 has opposite first 90 and second 92 ends, the first end 90 being attached to the fixed element 84, and the second end 92 being attached to the sliding element 86. Thus, upon being actuated in an extending direction as shown by arrow 94 in FIG. 11, the actuator 88 will slideably extend the sliding element 86 from within the fixed element 84 in a telescoping manner, so as to expand the carrier frame 24. Conversely, upon being actuated in a retracting direction as shown by arrow 96 in FIG. 11, the actuator 88 will slideably retract the sliding element 86 into the fixed element 84 in a telescoping manner, so as to contract the carrier frame 24.

All of the actuators, in the upright elements and in the front and rear transverse elements, are typically hydraulic cylinder type actuators. The actuators are actuated by gasoline engine driven hydraulic pumps 112 mounted on the carrier frame.

The hoses, valves, etc., are not shown in the drawing, but are well known, and can be adapted by anyone skilled in the art. Alternatively, the actuators may be electric motor driven screw type actuators.

Figure 12:
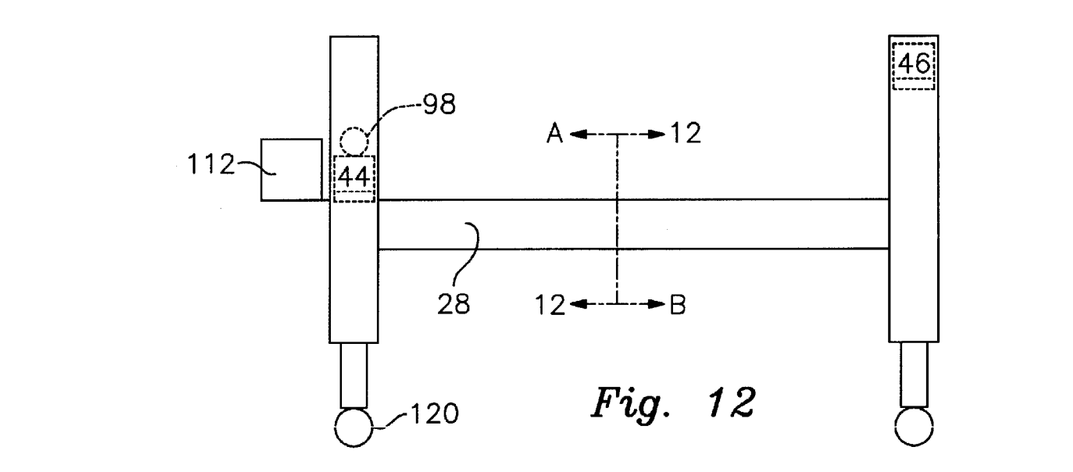
FIG. 12 is a side elevational view of the carrier frame, showing the carrier frame with self-contained gasoline engine driven hydraulic pumps and relative height position of the rear transverse element.
Figure 12A:
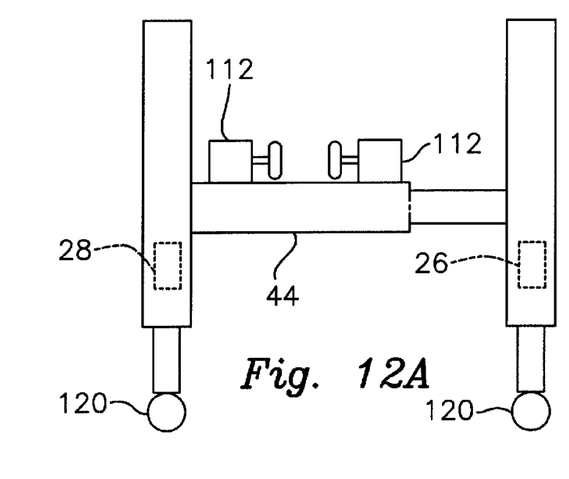
FIG. 12A is a sectional elevation view of the carrier frame of FIG. 12 depicting the gasoline engine driven hydraulic pumps.
Figure 12B:
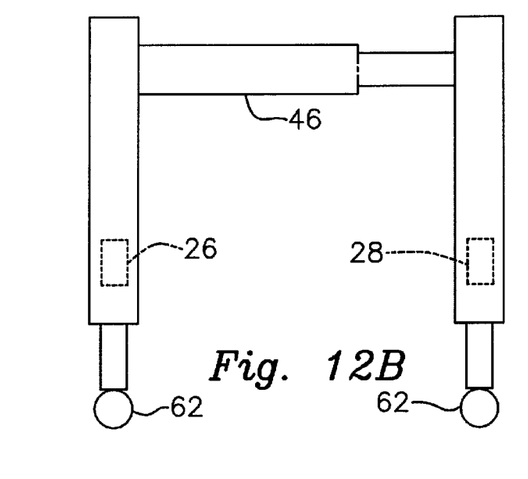
FIG. 12B is a sectional elevation view of the carrier frame of FIG. 12 depicting the rear transverse element.
Figure 14:
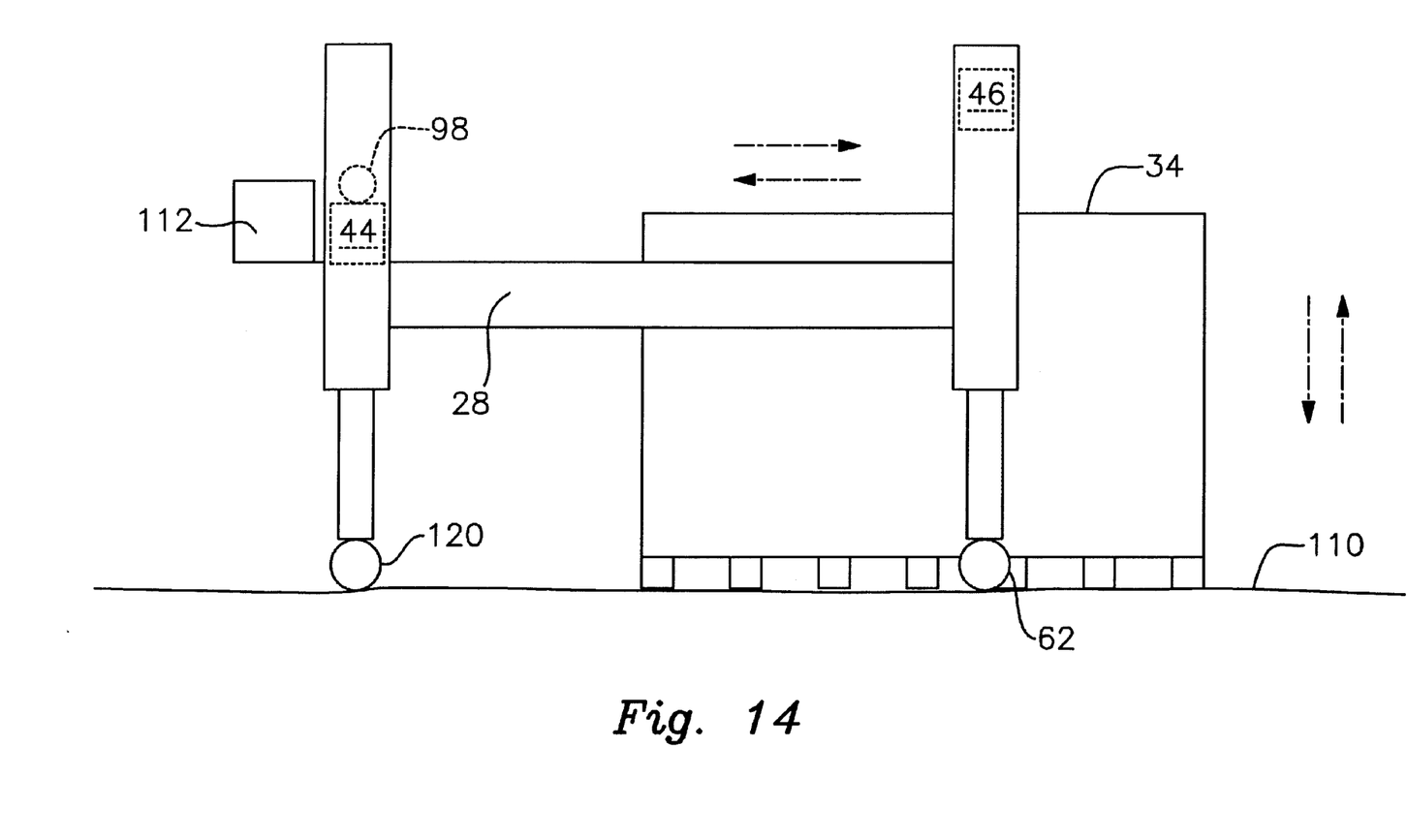
FIG. 14 is a side elevational view of the carrier frame of FIG. 1 passing over the container.

As shown on FIGS. 12–14 and 17, steering and mobility means 120,120a,120b are included with the front upright members lower ends 60 and/or the front and rear upright member lower ends 60, as previously described herein. Using these embodiments, rear transverse element 46 is shown in a position sufficient to clear the height of container 34 as depicted in FIGS. 12B and 14.

A vehicle platform 80 may include notches 108 on either side to receive and releasably retain the upright members 56 upon contraction of the carrier frame 24 into close juxtaposition with the vehicle 78, thereby locking the carrier frame 24 to the vehicle 78, allowing safe transport. However, in most cases, notches 108 are not necessary and the apparatus as described herein operates well with or without the notches 108.

It is to be understood that the above detailed description of embodiments of the invention is provided by way of example only. Various details of design and construction may be modified without departing from the true spirit and scope of the invention as set forth in the appended claims.

Now that the invention has been described,

What is claimed is:

1. An apparatus for lifting, handling and transporting a container having right and left sides and front and rear ends, the apparatus comprising:

a carrier frame including right and left longitudinal elements juxtaposed with the right and left sides, respectively, of the container to be handled and transported, each longitudinal element extending between opposite first and second ends, the carrier frame having selectively adjustable in length front and rear transverse elements juxtaposed with the front and rear ends, respectively, of the container to be handled and transported, each transverse element extending between opposite right and left ends, the left ends of the front and rear elements being adjacent to the first and second ends, respectively, of the left longitudinal element, and the right ends of the front and rear elements being adjacent to the first and second ends, respectively, of the right longitudinal element, the carrier frame further including a plurality of generally vertical upright members, each upright member extending between opposite upper and lower ends;

bearing means attached to each upright member lower end, for ground bearing and relative movement of the upright members with the ground, the bearing means being one of a single wheel assembly and a dual wheel single axle assembly;

elevating means for elevating and lowering the carrier frame with respect to the ground;

a fixed laterally directed wheel assembly extending downwardly a predetermined distance from each of the right and left longitudinal elements near the front transverse element, the fixed laterally directed wheel assemblies for allowing selective lateral expansion of the carrier frame to clear a transport vehicle platform, the container or both for positioning, and for allowing contraction of the carrier frame into close juxtaposition with the transport vehicle platform, the container or both for transporting;

supporting means connected to the carrier frame and to the container for supporting the container to the frame;

means for providing hydraulic power to actuators; and steering and mobility means at the upright member lower ends, the steering and mobility means including a swivel connection between the bearing means and the corresponding lower end of the rear upright members, a non-swivel connection between the bearing means and the corresponding lower end of the front upright members, a hydraulic motor with a drive shaft for mounting a sprocket gear, and a corresponding sprocket gear attached to the bearing means at the lower end of the front upright members for connecting a sprocket chain between the hydraulic motor drive shaft and the bearing means at the lower end of the front upright members, wherein the carrier frame is capable of being elevated to be moved over the container and is capable of being lowered around the container for attaching the carrier frame to the container for subsequent lifting, handling, and transporting of the container.

2. The apparatus of claim 1 wherein the upright members each further comprise a tubular fixed element attached to the carrier frame and a tubular sliding element mounted for sliding movement within the fixed element.

3. The apparatus of claim 2 wherein the elevating means further comprises a plurality of actuators, each actuator mounted within an upright member, each actuator having opposite first and second ends, the first end being attached to the tubular fixed element of the upright member, the second end being attached to the upright member tubular sliding element, so that upon being actuated in an extending direction, the actuators will slideably extend the sliding element from within the fixed element in a telescoping manner to elevate the carrier frame, and upon being actuated in a retracting direction, the actuators will slideably retract the sliding element into the fixed element in a telescoping manner to lower the carrier frame.

4. The apparatus of claim 1 wherein the carrier frame includes a pair of guide wheels, each guide wheel mounted for rotation on a generally vertical axis on an upright member adjacent the rear transverse element, with the guide wheels facing inward toward the container for engagement with the container to facilitate positioning the carrier frame with the container.

5. The apparatus of claim 1, wherein each front and rear transverse elements further comprise:

a tubular fixed element;

a tubular sliding element mounted for sliding movement within the fixed element;

an actuator mounted within each front and rear transverse elements, the actuator having opposite first and second ends, the first end being attached to the fixed element, the second end being attached to the sliding element, so that upon being actuated in an expanding direction, the actuator will slideably extend the sliding element from within the fixed element in a telescoping manner to expand the carrier frame, and upon being actuated in a contracting direction, the actuator will slideably retract the sliding element into the fixed element in a telescoping manner to contract the carrier frame; and wherein the actuators mounted within each front and rear end transverse elements are hydraulic cylinder type actuators.

6. The apparatus of claim 5 wherein the actuators mounted within each front and transverse elements are electric motor driven screw type actuators.

7. The apparatus of claim 1 wherein the supporting means include a plurality of chains, each chain being fixed on one end to the carrier frame and the other end of the chain in releasable engagement with the container.

8. The apparatus of claim 1 wherein the container and the carrier frame may be transported simultaneously on the platform of the transport vehicle.

* * * * *